United States Patent [19]

Finnemore

[11] 4,313,664
[45] Feb. 2, 1982

[54] CARRYING STRAP ATTACHMENT FOR CAMERA

[75] Inventor: Fred M. Finnemore, North Reading, Mass.

[73] Assignee: Polaroid Corporation, Cambridge, Mass.

[21] Appl. No.: 220,896

[22] Filed: Dec. 29, 1980

[51] Int. Cl.³ .................. G03B 17/02; G03B 29/00; A44C 5/18
[52] U.S. Cl. .................. 354/288; 24/265 R; 354/82
[58] Field of Search ............ 354/288, 81, 82, 293; 224/150, 207; 24/265 A, 265 R

[56] References Cited

U.S. PATENT DOCUMENTS

| | | | |
|---|---|---|---|
| 315,175 | 4/1885 | Sly | 24/265 A X |
| 1,144,140 | 6/1915 | Kroedel et al. | 354/288 |
| 1,325,372 | 12/1919 | Penny | 224/207 |
| 2,172,348 | 9/1939 | Githens et al. | 354/82 X |
| 2,889,095 | 6/1959 | Heidecke et al. | 224/257 |
| 3,438,467 | 4/1969 | Milette et al. | 190/58 R |
| 3,501,117 | 3/1970 | Soltysik | 248/71 |
| 3,678,832 | 7/1972 | Dietz et al. | 354/82 X |
| 3,868,700 | 2/1975 | Kuramoto | 354/288 X |
| 3,916,089 | 10/1975 | Sloan | 174/164 |
| 3,922,694 | 11/1975 | Davis | 354/82 |
| 3,936,845 | 2/1976 | Morse | 354/82 |
| 3,979,762 | 9/1976 | Hendry et al. | 354/288 |
| 4,007,470 | 2/1977 | Land | 354/293 |
| 4,068,248 | 1/1978 | Pizzuti et al. | 354/293 X |
| 4,239,365 | 12/1980 | Norris | 354/288 X |

*Primary Examiner*—Donald A. Griffin
*Attorney, Agent, or Firm*—Leslie J. Payne

[57] ABSTRACT

A carrying strap is connected to an internally disposed surface of a cover member which is in covering relation to an access opening in a camera body. The cover member in covering the access opening also covers a test terminal which prior to application of the cover permits at least one operational component electrically connected thereto to be tested by a test source external of the body. The cover has spaced apart latching arrangements which exceed the spacing between cooperating latching arrangements on the body. Intermediate these latching arrangements is a cover fulcrum latching arrangement permitting flexing of the cover member so that first one then the other cover latching arrangements are latched prior to the intermediate latching arrangement being forced into latching engagement with the body.

14 Claims, 8 Drawing Figures

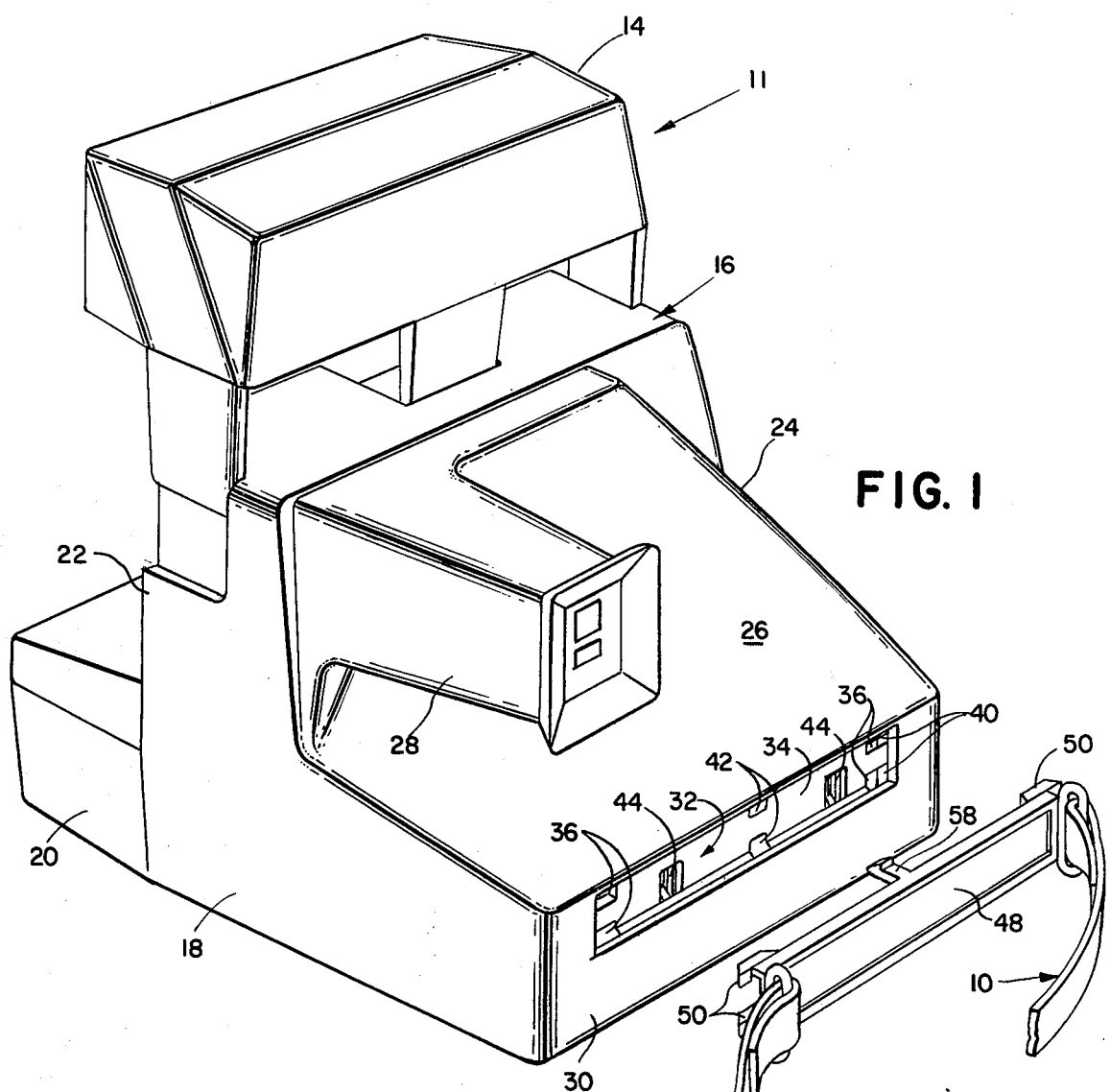
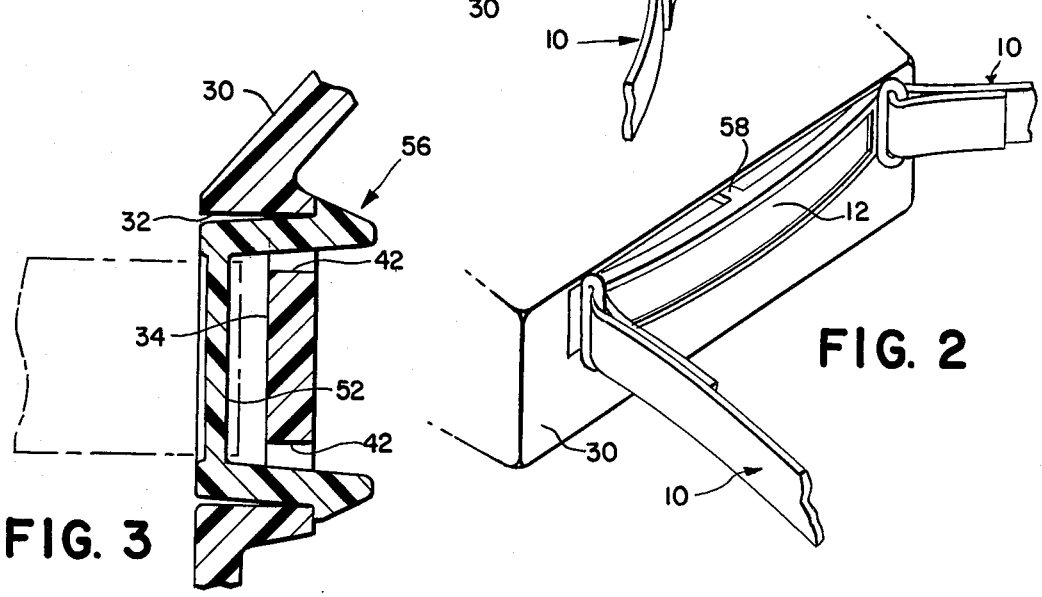

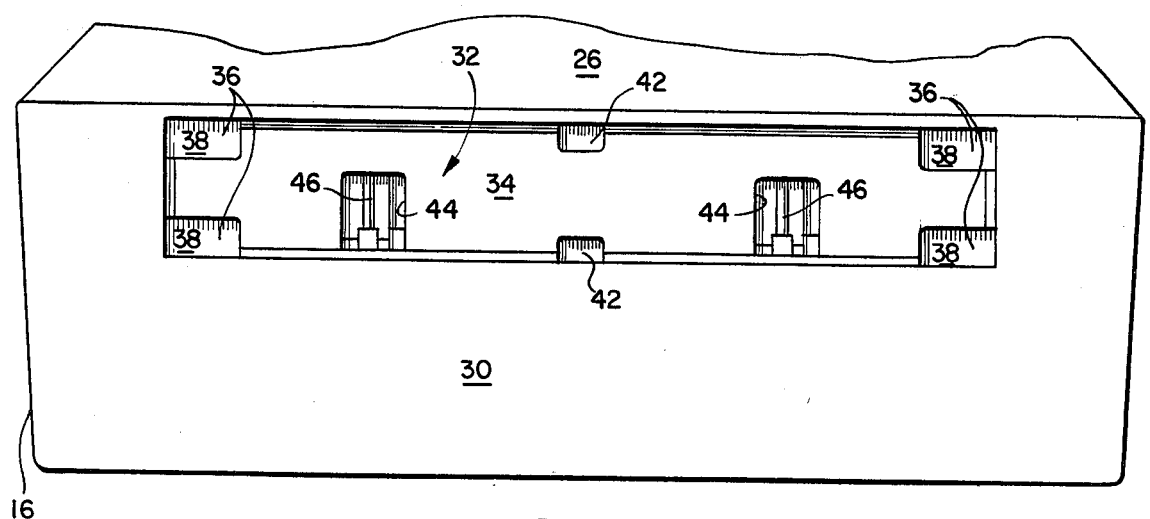
FIG. 4
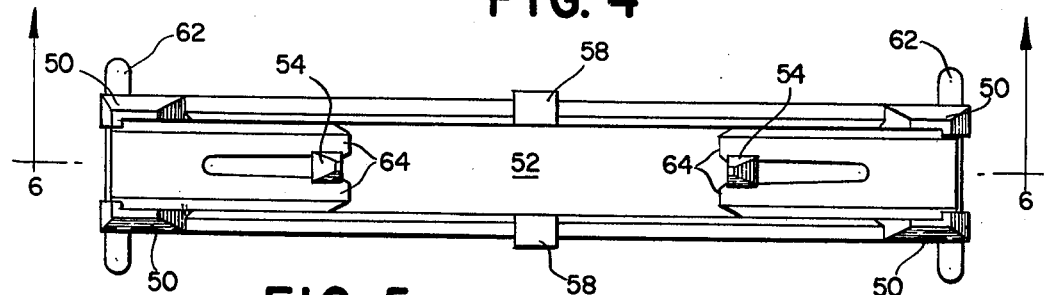
FIG. 5
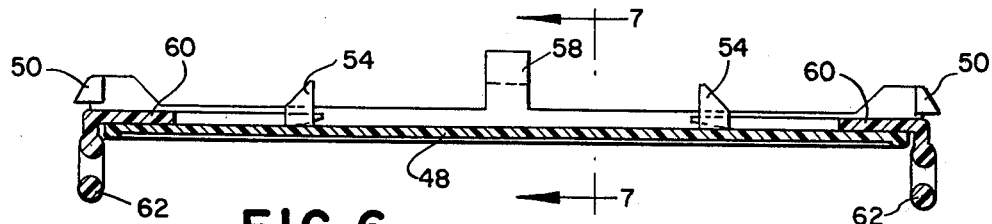
FIG. 6
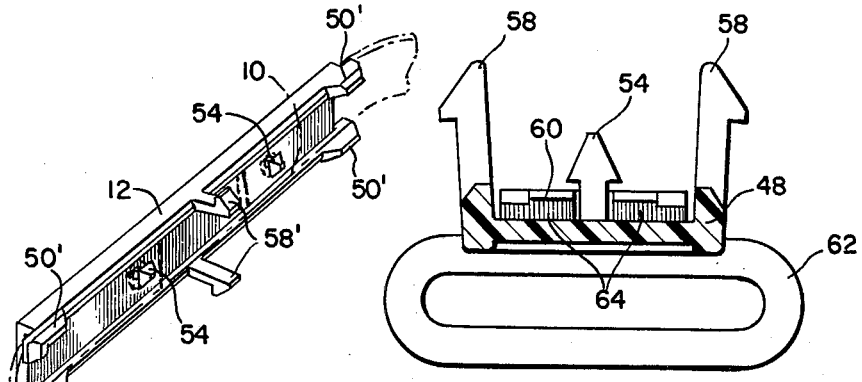
FIG. 7
FIG. 8

CARRYING STRAP ATTACHMENT FOR CAMERA

BACKGROUND OF THE INVENTION

This invention relates to accessories attachable to photographic apparatus and, more particularly to carrying strap attachments.

Use of carrying straps for photographic apparatus is well-known. Among other things, these straps protect against inadvertent camera dropping, facilitate camera transport and free the user's hands.

One fairly common kind of attachment device for such straps are the eyes or loop devices fixedly anchored on the camera body and to which opposite ends of flexible straps are attached. U.S. Pat. No. 2,172,348 discloses a camera housed in a camera casing with the camera attached to a removable bottom wall of the casing and the carrying strap attached to both the bottom casing wall and casing side wall. Such an approach is unsatisfactory because it requires among other things several components including a rather cumbersome casing and strap relationship. U.S. Pat. No. 2,889,095 discloses a relatively complicated mechanical fixture for attaching carrying straps to cameras. Commonly assigned U.S. Pat. Nos. 3,922,694 and 3,936,845 disclose detachable carrying strap attachments. These attachments are very satisfactory for the purposes intended, but because of their detachable nature, require several components. Another known approach for securing carrying straps to cameras include riveting the strap ends to the camera. Also, while it is known to attach single flexible covers in covering relation to a recess, such known covers are not made to withstand loading such as the type a camera carrying strap would exert.

In general, known carrying strap attachments for cameras have several components used in the construction thereof which are often cumbersome from the standpoint of assembly or use.

This is significant because in the highly competitive photographic field, it is increasingly important to minimize the costs associated with the production of components used in the products marketed. For instance, if many piece parts are required, such requirement increases relatively significantly the time, labor and costs associated with manufacture and assembly of the products. This is, of course, undesirable.

In assembling cameras, particularly ones of the instant type such as disclosed in commonly assigned U.S. Pat. No. 3,979,762, other difficulties arise. These difficulties stem from the fact that the camera's operational components need to be pretested. With previous cameras of this type, pretesting would be accomplished by testing probes contacting battery contacts which were connected to these operational components. Since these contacts are fragile, extreme care must be taken so as not to damage them. Also, with such battery contacts many of the pretesting steps were accomplished while testing probes were inserted into the film pack receiving chamber while the loading door was open. Although pretesting could be accomplished, significant drawbacks appeared. Since the loading door was opened, the spreading system including the processing rollers and gear drive therefor could not be tested. They could be tested only when an actual film pack was inserted in the film pack receiving chamber. It will be appreciated that because of this arrangement actual film units would have to be tested for each camera being produced. This obviously constituted a costly pretesting procedure.

SUMMARY OF THE INVENTION

In accordance with the present invention, there is provided an improved photographic apparatus having a housing, a test terminal disposed in the housing and being electrically connected to at least one operational component that is to be tested so as to insure that the component functions in the manner intended. Formed in the housing is an access opening permitting the test terminal to be connected to a test score external of the housing. A cover member is connected to the housing in covering relation to the access opening and terminal. Connected to an internally disposed surface of the cover is a carrying strap extending exteriorly of the cover member and housing.

In an illustrated embodiment, the housing and cover have cooperating latching structure and the access opening is defined so that the cover is generally flush with the surrounding housing surface.

Also, the housing wall structure has a pair of spaced apart end latching arrangements and intermediate thereof an intermediate latching arrangement. Formed on the cover is a pair of spaced apart end latching arrangements with the spacing exceeding spacing between the spaced apart housing latching arrangements, and intermediate thereof a fulcrum latching arrangement. The fulcrum latching arrangement requiring a latching force exceeding the force necessary to flex the cover member so as to permit one of the end cover latching arrangments to engage the corresponding end latching arrangment of the housing and the cover member to be flexed about the fulcrum latching member to thereby permit latching enegagement of the other of the end cover latching arrangments prior to the intermediate fulcrum latching member being forced into latching engagement with the intermediate housing latching arrangement by forces centrally applied to the cover in the area of the intermediate fulcrum member.

Among the objects of the invention are, therefore, the provision of an improved carrying strap attachment for a photographic apparatus; the provision of an improved carrying strap attachment for covering test terminals of a photographic apparatus; and the provision of an improved photographic apparatus which permits a single cover member to fixedly secure a strap to a camera recess.

Other objects and further scope of applicability of the present invention will become apparent from the detailed description to follow taken in conjunction with the accompanying drawings wherein like reference numerals indicate like structure throughout the several views.

BRIEF DESCRIPTION OF THE DRAWINGS

FIG. 1 is an exploded perspective view illustrating the rear of a photographic apparatus and carrying strap cover of the present invention;

FIG. 2 is a fragmentary perspective view showing the cover strap attachment in the process of being connected to the camera;

FIG. 3 is an enlarged fragmentary cross-sectional view better illustrating details of the cooperative cover between the strap attachement and the camera;

FIG. 4 is an enlarged fragmentary view illustrating the recess formed in the photographic apparatus which includes therein a pair of battery contacts;

FIG. 5 is a plan view of the carrying strap attachment of the present invention;

FIG. 6 is a cross-sectional view taken along the section line 6—6 appearing in FIG. 5;

FIG. 7 is a cross-sectional view taken along section line 7—7 appearing in FIG. 6; and, FIG. 8 is a perspective view showing another embodiment of the cover carrying strap attachment of this invention.

DETAILED DESCRIPTION

Reference is made to FIG. 1 for illustrating a carrying strap 10 which is connectable to a photographic camera apparatus 11 by an improved carrying strap cover member 12. The photographic camera 11 is of the instant or self-developing type, such as disclosed in commonly assigned U.S. Pat. No. 4,231,645.

Since the camera 11 does not, per se, form part of this invention, only a description of those components necessary for an understanding of this invention will be given. Briefly described, the camera apparatus 11 includes a foldable electonic flash unit 14 mounted on camera housing 16. The flash unit 14 moves between an erect position (FIG. 1) and a folded condition (not shown). Included in the camera housing 16 is a bottom base section 18 having therein a chamber for receiving a film pack (not shown) of the type having a plurality of film units (not shown) therein. Each film unit is successively located at the camera's focal plane. For a representative example of such a film pack, see commonly assigned U.S. Pat. No. 3,887,045. Further, such a film pack includes an electrical battery for powering the camera's electrical system including a circuit for charhging the flash unit 14. Extending forwardly of the base section 18 and pivotally mounted thereto is a loading door 20. Movement of a slide latch (not shown) permits the door 20 to be pivoted downwardly to provide access to the chamber. The loading door 20 is provided with a film withdrawal or exit slot (not shown) for permitting the exposed film to be ejected from the camera housing 16 after being advanced in such a manner by processing rollers housed in the loading door.

Positioned over the base secton 18 is a housing section 22 for housing a majority of the camera's focusing and exposure control components. Although not shown, this front wall can include adjustable focus lens and a photocell window for admitting scene light to a photocell which forms part of the exposure control system. Behind the housing section 22 is housing section 24 having a downwardly sloping rear wall 26 for defining an exposure chamber (not shown). Included in the exposure chamber is an inclined mirror. Extending rearwardly of the housing section 24 is a viewfinder tube 28 which communicates with a front viewfinder lens (not shown) mounted in the front wall of the housing section 22 to form a viewfinding system.

Formed in the back wall 30 of the bottom base section 18 is a generally elongated rectangular recess 32 having a generally flat supporting wall 34. At each corner of the recess 32 the supporting wall 34 is formed with latch receiving recesses 36 having a generally flat supporting wall 38. Each of the latch receiving recesses 36 communicates with side openings 40 (FIG. 1) which permit access to the interior wall surfaces of the back wall 30 for facilitating latching in a manner to be described. Intermediate the latch receiving recesses 36 is a pair of opposed intermediate latch receiving openings 42 which also permit access to the interior surfaces of the back wall 30. Equidistantly spaced on opposite sides of the intermediate latch receiving openings 42 are battery contact openings 44. Accessible through the contact openings 44 are test terminal portions 46 of battery contacts. Such battery contacts are of the type disclosed in U.S. Pat. No. 3,979,762 which electrically interconnect operable sub-modules and components to the battery (not shown) carried in the film pack. Pretesting of such sub-modules and components is performed by having the test terminals 46 of the battery contacts engaged by testing probes (not shown) in circuit with appropriate external electric power source.

Reference is made to FIGS. 1-7 for showing one embodiment of the carrying strap cover member 12 of this invention. As shown, the cover member 12 is shown having an integral elongated body 48 preferably made from a resiliently flexible plastic material. At opposing ends of the cover 12 are formed latching arrangements which in this embodiment are defined spaced apart pairs of latching conformations 50. These latching conformations 50 extend longitudinally from the longitudinal ends of the cover 12 so that the entire length of the cover exceeds that of the recess 32 (FIGS. 1 and 4). The latching conformations 50 are sized and shaped so as to fit within corresponding ones of the latch receiving recesses 36 and have their distal ends extending through the openings 40 (FIG. 1) so that the latching conformations can have a tight latching fit with the internal surfaces of the back wall 30. The internal surface 52 of the cover 12 is provided with a pair of spaced apart staking pins 54, the purpose of which will be described subsequently.

For effecting attachment of the cover 12 to the camera housing 16, the cover 12 has formed thereon, intermediate the latching conformatons 50, a fulcrum latching arrangment 56. In this embodiment, the fulcrum latching arrangement 56 is comprised of a pair of spaced apart resiliently flexible latching fingers 58. As best shown in FIG. 2, the latching fingers 58 will initially engage the intermediate side walls defining the recess opening 32. This engagement occurs after the latching conformations 50 at one end of the cover 12 cooperate with the corresponding latch receiving recesses 36 and openings 40. It should be pointed out that the conformations 50 engage the inner surfaces of the back wall 30 and thereby assist in preventing the cover 12 from being removed. The latching fingers 58 meet sufficient resistance by the back wall 30 prior to their movement into latching engagement. Because the fulcrum latching fingers 58 do not initially move into latching engagement, the unlatched conformations 50 are at an angle or in a cantilevered position relative to the back wall 30. Because of this and because of the noted resistance, a person assembling the cover can directly apply forces near the unlatched end of the cover 12. This will cause the bending or bowing of the cover shown in FIG. 2. Such bending allows the longer cover 12 to fit within the shorter recess 32 by permitting the unlatched latching conformations 50 to be inserted into the corresponding latch receiving recesses 36. Following this, a person attaching the cover 12 merely applies sufficient force against the center of the cover so as to further flex the latching fingers 58 until they pass through the intermediate latch openings 42 and have a snap-fit engagement with the interior surface of the back wall 30 such as seen in FIG. 3. As this occurs, the latching conformations 50 slide through the openings 40 and into latching cooperation with the interior surfaces of the back wall 30. It will be appreciated that the latching force applied to latch the fingers 58 exceeds the bowing or bending forces applied to the cover during insertion of the cover.

In this embodiment, a pair of carrying strap anchors 60 are provided. Essentially, the carrying strap anchors 60 have an L-shaped configuration with a wide loop 62 at one end and a pair of spreadable mounting fingers 64 at the other end. The spreadable fingers 64 slide between the latching conformations 50 and on opposite sides of the staking pins 54 whereby they are spread apart by the staking pins. The staking pins 54 have enlarged free ends which tend to restrain against tilting upward movement of the anchors 60 and also tend to distribute forces being applied by the strap during carrying. The wide loops 62 extend away from the external surface of the cover 12 and away from the camera housing 16. Such loops 62 can receive therethrough wide carrying straps, the width dimension thereof, of course, depending upon the size of the loop 62. The anchors 60 can be made of a high impact plastic material so as to better withstand the stresses developed during carrying. It will be appreciated that the walls defining the recess 32 are spaced from the ends of the body 48 so as to accommodate the anchors 60 therebetween. When the cover 12 is seated in the recess, it has a flush fit with the exterior surfaces of the back wall 30. Such fitting, of course, enhances the aesthetics of the camera.

An even more simplified version of the improved cover strap attachment of this invention is shown in FIG. 8. In this embodiment, the anchors 60 are absent. Instead of using the anchors 60 for securing the carrying strap 10, the strap has openings in its opposed ends which fit over the staking pins 54 and are held by the mushroom ends of the pins to retain the strap against the surface 52. For allowing the carrying strap 10 to pass exteriorly of the camera housing 16, the longitudinal ends of the cover 12 and the cooperating walls defining the recess 32 are spaced sufficiently to allow the strap to pass and be squeezed therebetween when the cover 12 is in covering relationship with the recess. Also, in this regard the carrying strap 10 extends between the latching conformations 50, at each end of the cover 12 as well as side rails formed on the interior surface 52. This allows the strap 10 to engage the internal surface 52 so as to distribute the carrying forces thereagainst. When the cover 12 is assembled in covering relation to the recess 32, it is generally flush with the exterior surfaces of the back wall 30.

Because the cover 12 is a single piece, it can easily assemble the carry strap 10 to the camera 11. Moreover, the essential portion of the force of the strap during carrying of the camera is exerted against the longitudinal extent of the cover to thereby reduce forces tending to pull the latching formations from the housing.

As with the previous embodiment, because the cover 12 can be attached as indicated, the test terminals 46 can remain exposed to allow for pretesting of camera components by external testing probes from an external source of power. Since the test terminals are surrounded by the exterior housing and have only small portions exposed, the risk of damage to the fragile battery contacts by testing probes contacting them is minimized. Since the test terminals are accessible from the back of the camera, such arrangements enhances pretesting efficiency. This is because it allows systems, such as the spreading system, to be pretested with the loading door closed. Due to the door being closed test film is not needed to test the mechanical operation of the spreading system. This is beneficial because test film need not be used. Clearly this is a highly significant benefit from the standpoint of reducing camera assembly costs. Advantageously, the extremely simple nature of these embodiments present marked improvements over the prior art in terms of production and assembly costs as well as pretesting of operational components.

The structure and operations of the above embodiments are evident from the foregoing description.

Since certain changes may be made in the above-described apparatus without departing from the scope of the invention herein involved, it is intended that all matter contained in the description or shown in the accompanying drawings shall be interpreted as illustrative and not in a limiting sense.

What is claimed is:

1. A photographic apparatus having a housing; a test terminal disposed in said housing and being electrically connected to at least one operational component that is to be tested so as to insure that the component functions in the manner intended, said housing having an access opening permitting said test terminal to be connected to a test source external of said housing; a cover member connected to said housing in covering relation to said access opening and said terminal, and a carrying strap connected to an internally disposed surface of said cover member with said strap extending exteriorly of said cover member and housing.

2. The photographic apparatus of claim 1 wherein said housing and cover member include cooperative latching arrangement providing a snap fit assembly of said cover member to said housing.

3. The apparatus of claim 2 wherein said housing has a wall structure which defines a recess which includes the access opening and is constructed so that when said cover member is connected to said housing said cover member fits in said recess so that its externally disposed surface is generally flush with the external surrounding surface of said housing.

4. The apparatus of claim 1, 2 or 3 wherein said housing has a wall structure having a pair of spaced apart end latching arrangements and intermediate thereof an intermediate latching arrangement, said cover member having a pair of spaced apart end latching arrangements, which spacing exceeds the spacing between said spaced apart housing latching arrangements, and intermediate thereof a fulcrum latching arrangement, said cover latching arrangements being latched to corresponding latching arrangements on said housing, said intermediate fulcrum latching arrangement requiring a latching force exceeding the force necessary to flex said cover member so as to permit one of said end cover latching arrangements to engage the corresponding end latching arrangement of said housing and the cover member to be flexed about said fulcrum latching member to thereby permit latching engagement of the other of said end cover latching arrangements prior to the intermediate fulcrum latching member being forced into latching engagement with said intermediate housing latching arrangement by forces centrally applied to said cover member in the area of said intermediate fulcrum member.

5. The apparatus of claim 3 wherein said neck strap has its opposite ends secured together, and said cover member includes staking members connecting said strap to the internally disposed surface of said cover member.

6. The apparatus of claim 3 further including a pair of neck strap holders connected to opposite end portions of the internally disposed surface of said cover member by cover retaining members formed on the internally disposed surface, and each of said holders being configured for holding opposite ends of said strap.

7. The apparatus of claim 2 wherein said cover member includes a pair of longitudinally opposed latching fingers constructed to latch said cover to said housing, and a fulcrum member extending outwardly from said internally disposed surface intermediate said spaced apart latching fingers so as to initially contact said housing and serve as a fulcrum for permitting bending of said cover member so that first one and then the other of said latching fingers can be forced into latching engagement with the said housing prior to said fulcrum member being flexed into a latching arrangment with the housing.

8. A photographic apparatus having a housing with a wall structure defining a recess therein and housing latching structure associated with said recess; cover means connected to said housing for generally covering said recess; a neck strap connected to said cover means so that said neck strap extends exteriorly of said housing; said cover means having a pair of longitudinally spaced cover latching members which cooperate with corresponding ones of said housing latching structure; said cover means having means for initially contacting said housing during assembly thereto and for causing bowing of said cover means so that both said latching members can cooperate with said latching structure and for subsequently passing into latching engagement with a cooperating additional latching structure of said housing.

9. The apparatus of claim 8 wherein said neck strap has opposite ends secured together, and said cover member includes staking members connecting said strap on the internally disposed surface of said cover member.

10. The apparatus of claim 8 further including a pair of neck strap holders connected to retaining structure at opposite end portions of the internally disposed surface of said cover member by cover retaining members formed on the internally disposed surface, and each of said holders being configured for holding opposite ends of said strap.

11. The apparatus of claim 10 wherein each of said cover retaining members has an elongated pair of flexible arms which are slidable on said internally disposed surface, and said retaining structure includes a head portion inserted between said arms so as to retain said arms in place.

12. In a photographic camera having a housing, a carrying strap, and means for connecting said carrying strap to said housing, the improvement wherein said connecting means comprises an elongated member mounted on a wall of said housing, said member having a pair of latching formations located at its distal ends, said pair of latching formations extending within said housing longitudinally of said member along the interior of said housing wall, and said strap extends from the interior wall of said member at locations adjoining the distal ends thereof and inwardly of said pair of latching formations such that an essential portion of the force of said strap during carrying of said camera is exerted longitudinally against said member thereby reducing the forces tending to pull said pair of latching formations from said housing.

13. The improvement of claim 12 wherein said member includes a third latching formation centrally located between said distal ends, said housing includes a latching formation configured for cooperative engagement with said third latching formation, and said member is snap fitted to said camera by bowing said member over said third latching formation to insert both said latching formations in said camera wall, and then seating said third latching formation in the cooperative latching formation of said housing.

14. The improvement of claim 13 wherein said third latching formation is constructed to require more latching force than the flexing force of said member so as to operate as a fulcrum for bowing said member during insertion of said pair of latching formations into said housing.

* * * * *